(12) United States Patent
Shen

(10) Patent No.: US 8,793,494 B2
(45) Date of Patent: Jul. 29, 2014

(54) METHOD AND APPARATUS FOR RECOVERING SESSIONS

(75) Inventor: Shuo Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 206 days.

(21) Appl. No.: 12/876,855

(22) Filed: Sep. 7, 2010

(65) Prior Publication Data

US 2010/0332836 A1    Dec. 30, 2010

Related U.S. Application Data

(63) Continuation of application No. PCT/CN2009/070613, filed on Mar. 3, 2009.

(30) Foreign Application Priority Data

Mar. 4, 2008  (CN) .......................... 2008 1 0065487

(51) Int. Cl.
  *G06F 15/16* (2006.01)
  *H04L 29/06* (2006.01)
(52) U.S. Cl.
  CPC ............ *H04L 63/08* (2013.01); *H04L 63/0435* (2013.01)
  USPC ....................................................... 713/171
(58) Field of Classification Search
  CPC .............................. H04L 63/08; H04L 63/0435
  USPC .................................................. 713/150, 171
  See application file for complete search history.

(56) References Cited

U.S. PATENT DOCUMENTS

| 5,751,719 | A  | * | 5/1998 | Chen et al. ..................... 370/473 |
| 5,961,601 | A  |   | 10/1999 | Iyengar |
| 6,246,771 | B1 | * | 6/2001 | Stanton et al. ................. 380/286 |
| 6,253,326 | B1 | * | 6/2001 | Lincke et al. ................... 726/12 |
| 6,396,805 | B2 | * | 5/2002 | Romrell ......................... 370/216 |
| 7,178,051 | B2 | * | 2/2007 | Barr et al. ....................... 714/4.4 |
| 7,188,176 | B1 |   | 3/2007 | Nedderman et al. |

(Continued)

FOREIGN PATENT DOCUMENTS

| CN | 1767442 A | 5/2006 |
| CN | 1863061 A | 11/2006 |
| CN | 1906883 A | 1/2007 |
| WO | WO 0079726 A2 | 12/2000 |

OTHER PUBLICATIONS

Lonvick C et al: The Secure Shell (SSH) Transport Layer Protocol; RFC4853, Jan. 2006, IETF Standard, Internet Engineering Task Force, p. 2.*

(Continued)

*Primary Examiner* — Jeffery Williams
*Assistant Examiner* — Christopher C Harris
(74) *Attorney, Agent, or Firm* — Brinks Gilson & Lione

(57) ABSTRACT

A method for recovering sessions includes storing, by a client, session information after a session is established between the server and the client. When the session needs to be recovered upon interruption, the client sends all state information before interruption of the session and the session information to the server, and the server recovers the session upon the received session information and all state information before interruption of the session. After a session is interrupted, the server does not need to store any session-related information, thus saving the resources of the server, and all information about the previous session can be recovered completely.

17 Claims, 3 Drawing Sheets

(56) References Cited

U.S. PATENT DOCUMENTS

| | | | |
|---|---|---|---|
| 7,526,560 B1* | 4/2009 | Samar | 709/228 |
| 2003/0212887 A1 | 11/2003 | Walther et al. | |
| 2003/0233361 A1 | 12/2003 | Cady | |
| 2003/0236905 A1 | 12/2003 | Choi et al. | |
| 2004/0181598 A1 | 9/2004 | Paya et al. | |
| 2005/0154873 A1* | 7/2005 | Cam-Winget et al. | 713/150 |
| 2006/0013122 A1 | 1/2006 | Bound | |
| 2006/0155997 A1* | 7/2006 | Fritzges et al. | 713/171 |
| 2007/0288743 A1 | 12/2007 | Cam Winget et al. | |
| 2008/0195740 A1 | 8/2008 | Lowell et al. | |

OTHER PUBLICATIONS

Office Action issued in corresponding Chinese Patent Application No. 200810065487.6, mailed Dec. 13, 2011.

Extended European Search Report issued in corresponding European Patent Application No. 09718055.8, mailed Aug. 2, 2011.

Written Opinion of the International Searching Authority issued in corresponding PCT Patent Application No. PCT/CN2009/070613, mailed May 14, 2009.

International Search Report issued in corresponding PCT Application No. PCT/CN2009/070613; mailed May 14, 2009.

\* cited by examiner

METHOD AND APPARATUS FOR RECOVERING SESSIONS

CROSS-REFERENCE TO RELATED APPLICATIONS

This application is a continuation of International Application No. PCT/CN2009/070613, filed on Mar. 3, 2009, which claims priority to Chinese Patent Application No. 200810065487.6, filed on Mar. 4, 2008, both of which are hereby incorporated by reference in their entireties.

FIELD OF THE APPLICATION

The present application relates to the communications field, and in particular, to a method and apparatus for recovering sessions.

BACKGROUND OF THE APPLICATION

In client-server mode, for a secure session, a master key of the session needs to be generated through key exchange or an existing shared secret when the session is established initially; and the legal identity of both parties needs to be confirmed through client authentication and server authentication. The client and the server generate a traffic encryption (TE) key upon the master key. A TE key generally includes a set of keys, for example, a data encryption key, and an integrity protection key. A session may include different channels that are responsible for different tasks such as data transmission and remote control. In a session based on the Secure Shell (SSH) protocol, a session may have multiple channels concurrently.

If the session is interrupted actively or passively, a complete session establishment process may be initiated again between the client and the server, including key exchange, generation of a master key and a TE key, and authentication, to establish the required channels again or restart the tasks not completed in the previous session. In the process of re-establishing a session, the processes such as key exchange and authentication involve multiple interactions, and a perceivable delay occurs; the generation of the master key and the TE key adds a load to the CPU; because the interrupted tasks in the previous session need to be restarted, a waste of time occurs. In a practical situation, when the session and the tasks need to be recovered in a short time, re-establishing a session based on the prior art is unacceptable.

SUMMARY OF THE APPLICATION

The embodiments below provide a method and apparatus for recovering sessions so that a session can be recovered quickly after the session is interrupted in a communications network.

An embodiment provides a method for recovering sessions. The method includes: sending, by a client, all state information before interruption of a session and session information of the session to a server when the session needs to be recovered upon the interruption; and recovering, by the server, the session upon the received session information and all state information before the interruption of the session.

Another embodiment provides a method for recovering sessions. The method includes: by a server, encrypting session information of a client to generate first encrypted information by using a local key when a session is established between the server and the client, where the first encrypted information includes the session information and a first key shared by the client and the server; and sending the first encrypted information to the client; receiving the first encrypted information and second encrypted information sent by the client when the session needs to be recovered upon interruption, where the second encrypted information is generated by the client through encryption with the first key, and includes all state information before the interruption of the session; decrypting the first encrypted information with the local key to obtain the first key and the session information; and decrypting the second encrypted information with the first key to obtain all state information before the interruption of the session and recover the session.

Another embodiment provides an apparatus for recovering sessions. The apparatus includes a first encrypting unit, a first decrypting unit, a second decrypting unit, a first sending unit, and a first receiving unit. The first encrypting unit encrypts session information of a session with a first key to generate first encrypted information when the session is established between a server and a client, where the first encrypted information includes a second key shared between the server and the client, the first key is privately owned by the server, and the client is unable to know the first key. The first sending unit sends the first encrypted information to the client. The first receiving unit receives second encrypted information and the first encrypted information when the session between the server and the client needs to be recovered upon interruption, where the second encrypted information is generated by encrypting all state information before the interruption of the session with the second key. The first decrypting unit decrypts the first encrypted information received by the first receiving unit with the first key and obtains the second key. The second decrypting unit decrypts the second encrypted information with the second key to obtain all state information before the interruption of the session and recover the session.

BRIEF DESCRIPTION OF THE DRAWINGS

To illustrate the technical solution more clearly, the following outlines the accompanying drawings involved in description of the embodiments of the present invention or the prior art. Apparently, the accompanying drawings outlined below are exemplary only. Persons of ordinary skill in the art can derive other drawings from such accompanying drawings without departing from the scope of the claims.

DETAILED DESCRIPTION OF THE EMBODIMENTS

The technical solution is described in detail below with reference to the accompanying drawings. The embodiments described below are merely exemplary. Other embodiments derived by those skilled in the art may still fall within the scope of the claims.

Terms and definitions involved in the specifications are set forth below:

session recovery: a mechanism of recovering a session (rather than establishing a new session) after the session is interrupted;

full recovery: complete recovery of all information about the previous session;

stateless: the server does not need to store session-related information;

session information: information required for establishing a complete session between the client and the server, for example, information about key exchanges, generation of the master key and the TE key, and authentication; and all state information before interruption of a session: information about the state of an ongoing service between the client and the server before the interruption of the session, for example, a completion ratio of data transmission, and a sequence number of the last packet before the interruption. Such information can be used to recover the state upon the interruption of the session, and continue to complete the service.

Figure 1:
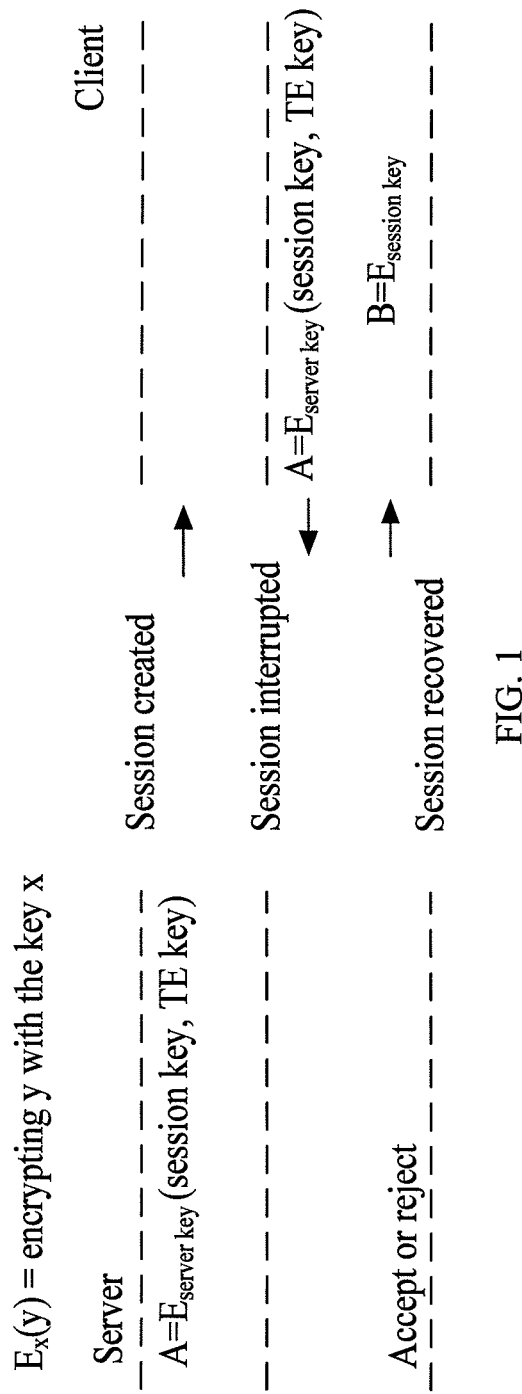
FIG. 1 is a schematic diagram of a method for recovering sessions according to an embodiment.
Figure 2:
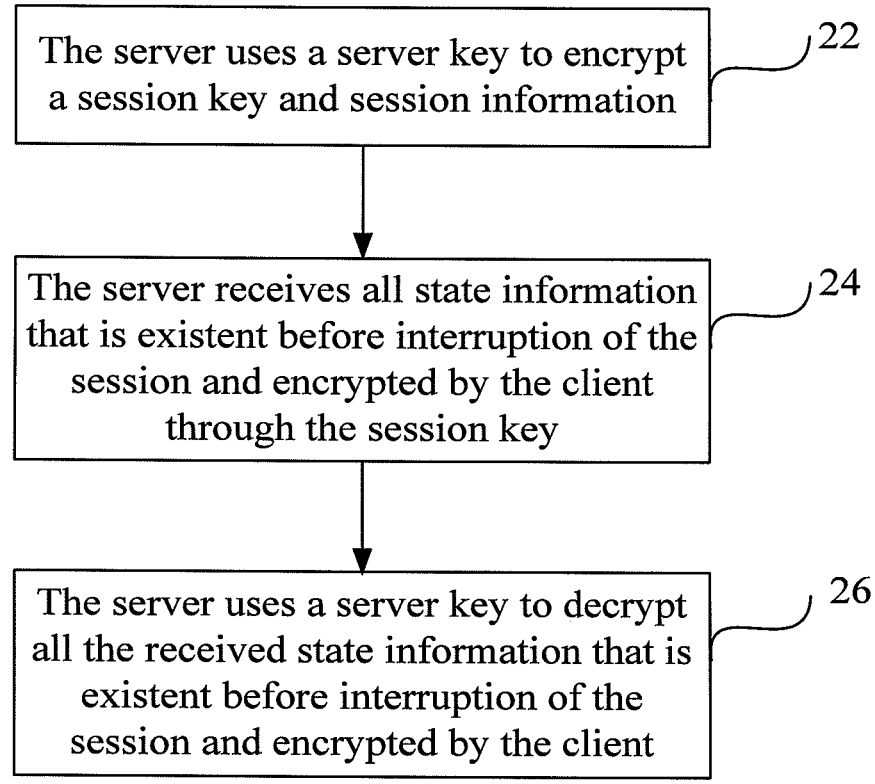
FIG. 2 is a flowchart of a method for recovering sessions according to an embodiment.

FIG. 1 is a schematic diagram of a method for recovering sessions according to an embodiment; and FIG. 2 is a flowchart of a method for recovering sessions according to an embodiment. As shown in FIG. 1 and FIG. 2, the method includes the following steps:

22: The server encrypts a session key and session information with a server key.

After a session is established between the server and the client, the server uses a local key (namely, server key x) to encrypt all information y of said session to obtain a result Ex(y), and generates a packet A according to the Ex(y). The encrypted session information y, which is authenticated through the server key x, includes at least a master key and session information of the session. The master key is a session key. The Packet A includes at least the session information and a key. The key is a session key and/or a TE key, and is shared between the server and the client. In FIG. 1, the key is shown as A=$E_{server\ key}$ (master key) or A=$E_{server\ key}$ (master key, TE key). The following description supposes that the packet A includes a TE key, a session key and session information, and A=$E_{server\ key}$ (master key, TE key).

The Packet A may be sent to the client by various possible means, and stored on the client. If the session is interrupted, the server does not need to store any information about the session.

When the session needs to be recovered, the client uses a session key to encrypt all state information before interruption of the session to obtain "information $E_{session\ key}$ (all state information before the interruption of the session)" and generate a packet B. The client sends the packet A and the packet B to the server.

24: The server receives all state information that is existent before the interruption of the session and encrypted by the client through the session key.

26: The server uses a server key to decrypt all the received state information that is existent before the interruption of the session and encrypted by the client.

The server uses the server key to decrypt the Packet A, and uses the session key in the Packet A to decrypt the Packet B and obtain all information related to the session, including the session information of the session and all state information before the interruption of the session, and thus the session is recovered.

Moreover, the Packet A or the Packet B may further include other information such as user ID or address information, authentication information, session-related information, and security-related information. The security-related information includes a validity period, a number of valid use times, and a timestamp of the Packet A.

In this embodiment, the keys included by the Packet A are not limited to the master key/TE key, and the Packet A may include any other key shared between the server and the client. The client encrypts the Packet B with the shared key. That is, both the session key and the TE key may be used to encrypt the Packet B.

In this embodiment, all state information before the interruption of the session, as well as the authentication key and the TE key of a session, can be recovered in the way of only one communication in the stateless condition, namely, in the condition that the server stores no information related to a specific client after the interruption of the session. That is, in this embodiment, a packet encrypted by the server and stored by the client carries a key shared by the server and the client, and the client generates the shared key, and uses the shared key to encrypt all state information before the interruption of the previous session. In the stateless session recovery, all information about the previous session can be recovered. The recovery mechanism can use this technology to fully recover all sessions that are in client-server mode.

An application instance of the embodiment shown in FIG. 1 is to recover an SSH session after the session is interrupted.

Currently, the SSH protocol provides no mechanism of recovering a session after the session is interrupted. To re-establish an SSH session, the server and the client need to interact many times to implement key exchange and authentication, and perform calculation involved in the key generation again. After the SSH session is established, channels need to be established to implement different tasks (such as data transmission, remote program execution, and TCP/IP port forwarding). One SSH session may have multiple channels. In the SSH protocol, each channel establishing packet applies for establishing only one channel. If all channels in the previous session are to be recovered, the channels need to be re-established one by one.

When the lower-layer transmission is not stable or the speed is limited, SSH interruption may occur frequently. The process of re-establishing the channels is slow, and the recalculation of the keys increases the load on the CPU, especially when the client resources are limited, which is hardly acceptable to the client.

In a network session based on the SSH protocol, a session may have multiple channels concurrently. In this case, the server uses a local key (namely, server key x) to encrypt all information y of the session to obtain a result Ex(y), and generates a packet A according to Ex(y). The encrypted session information y, which is authenticated through the server key x, includes at least a master key and session information of the session. The master key is a session key. The Packet A includes at least the session information and the key. The key is a session key and/or a TE key, and is shared by the server and the client. In FIG. 1, the key is shown as A=$E_{server\ key}$ (session key) or A=$E_{server\ key}$ (session key, TE key). The following description supposes that the packet A includes a TE key, a session key and session information, and A= $E_{server\ key}$ (session key, TE key).

The Packet A may be sent to the client by various possible means, and stored on the client. If the session is interrupted, the server does not need to store any information about the session.

The SSH session may have multiple channels concurrently. The session information y may include session information of multiple channels, or include session information of one or several channels. The session information y is encrypted into a packet, namely, packet A, and sent to the client. If the session information y includes session information of multiple channels and a shared key, all information related to the session and the shared key can be encrypted into a packet A' at a single attempt and sent to the client; if the session information y includes session information of only one or several channels and the shared key, the server may need to send multiple packets, namely, packets A1, A2, and so on, to the client for storing. The shared key here may be a session key or a TE key. The following description supposes that the shared key is a session key.

When the session needs to be recovered, the client uses a session key to encrypt all state information before the interruption of the session to obtain "information $E_{session\ key}$ (all state information before the interruption of the session)" and generate a packet B. The client sends the packet A and the packet B to the server.

The server uses a server key to decrypt the packet N (in the case that the session information y includes session information of the multiple channels and the shared key) or multiple packets A1, A2, and so on (in the case that the session information y includes session information of only one or several channels and the shared key). Afterward, the server uses the session key in the Packet A (the Packet A may be one Packet A' or multiple Packets A1, A2, and so on) to decrypt the Packet B and obtain all information related to the session, including the session information of the session and all state information before the interruption of the session, and thus the session is revered. That is, multiple channels in the session can be recovered quickly. Compared with the practice of re-establishing channels for the session one by one in the prior art, this embodiment improves the efficiency massively.

In this embodiment, the keys included in the Packet A are not limited to the master key/TE key, and the Packet A may include any other key shared between the server and the client. The client uses the shared key to encrypt the Packet B. That is, both the session key and the TE key may be used to encrypt the Packet B.

Considering more security requirements, in the case of an SSH session, the Packet A in FIG. 1 may include additional information such as a validity period of a the Packet A, a timestamp of delivering the Packet A, user ID that identifies the client of the Packet A, SSH session ID, and authorization information of the client.

The Packet B may further include: timestamp of requesting to recover the session, user ID, IP address, SSH session ID, and session services being requested to be recovered.

In the foregoing embodiment, after a session is interrupted, the server does not need to store any session-related information, and this saves the resources of the server; furthermore, all information about the previous session can be recovered completely.

Figure 3:
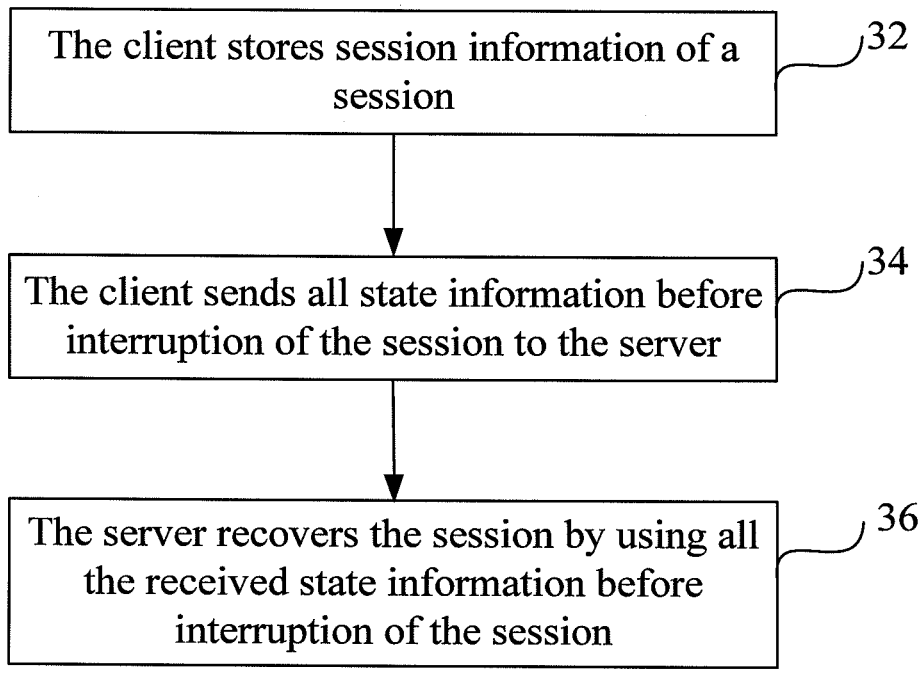
FIG. 3 is a flowchart of a method for recovering sessions according to another embodiment.
Figure 4:
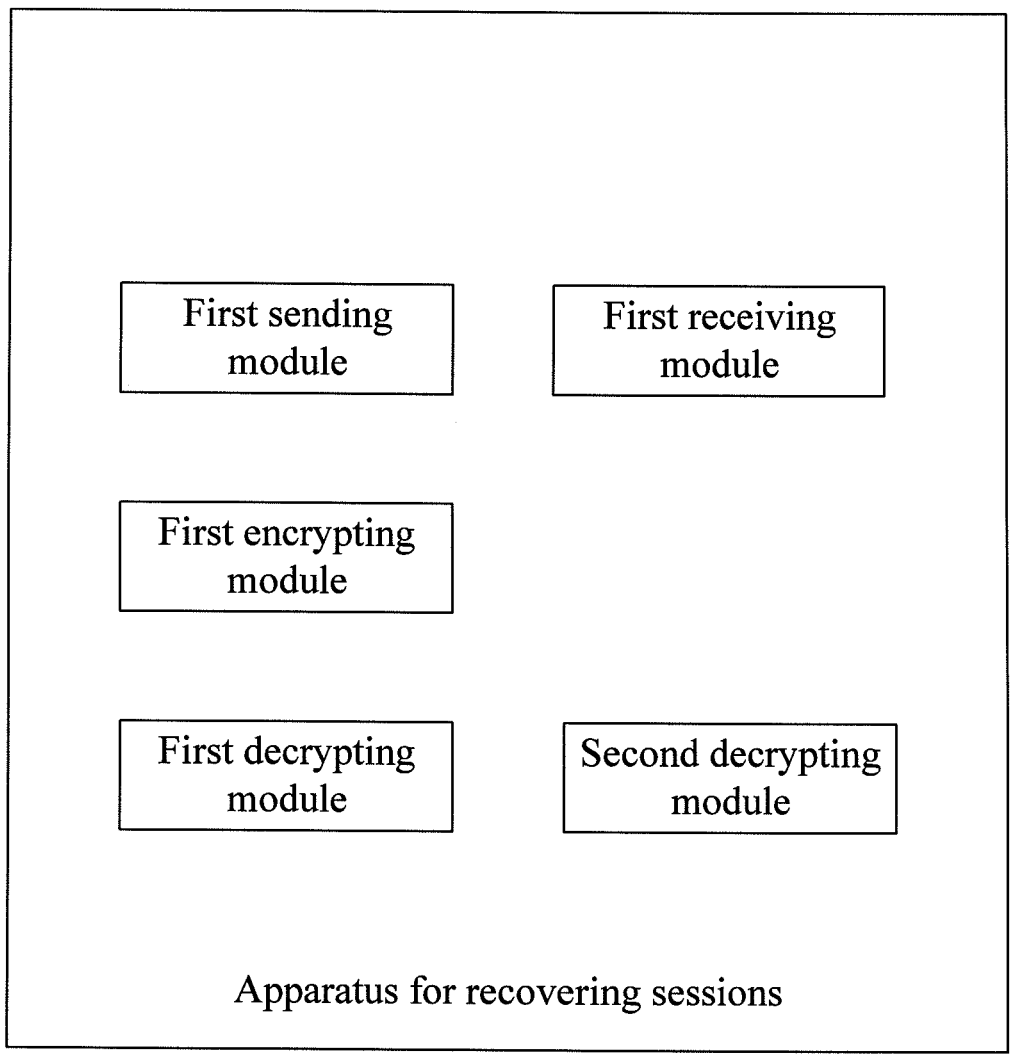
FIG. 4 shows a structure of an apparatus for recovering sessions according to another embodiment.

FIG. 3 shows a method for recovering sessions according to another embodiment. Assuming that mutual trust exists between the server and the client, and that no security problem exists between them. The method in this embodiment includes the following steps:

32: The client stores session information of a session.

After a session is established between the server and the client, the client stores the session information of the session.

34: The client sends all state information before the interruption of the session and the session information to the server.

When the session needs to be recovered upon the interruption, the client sends all state information before the interruption of the session and the session information to the server.

36: The server recovers the session upon the received session information of the session and all state information before the interruption of the session.

Considering the security in the data transmission in this embodiment, when the session needs to be recovered upon the interruption, the client sends all state information before the interruption of the session to the server in this way: The client uses the first key shared by the server and the client to encrypt all state information before the interruption of the session, and sends the encrypted state information to the server. In this case, the server uses the information to recover the session in this way: The server uses the first key to decrypt all state information before the interruption of the session and obtain all state information related to the session, and recovers the session according to the received session information.

In addition, to ensure that the server trusts the client, after a session is established between the server and the client, the server uses a local key to encrypt the session information of the session and the first key, and sends them to the client. The client stores the session information of the session and the first key. In this way, when the session needs to be recovered upon the interruption, the client needs to use the first key to encrypt all state information before the interruption of the session and send the encrypted information to the server, and return the first key and the session information received from the server and encrypted by the server through the local key to the server. The server uses the local key to perform decryption and obtain the first key and the session information, uses the obtained first key to decrypt all state information before the interruption of the session and obtain all state information related to the session, and recovers the session according to the received session information.

Another embodiment relates to an apparatus for recovering sessions. The apparatus is applied to a server, and includes a first encrypting unit, a first decrypting unit, a second decrypting unit, a first sending unit, and a first receiving unit.

The first encrypting unit encrypts session information of a session with a first key to generate first encrypted information when the session is established between the server and the client, where the first encrypted information includes a second key shared between the server and the client, the first key is privately owned by the server, and the client is unable to know the first key. The first sending unit sends the first encrypted information to the client.

The first receiving unit receives second encrypted information and the first encrypted information when the session between the server and the client needs to be recovered upon the interruption, where the second encrypted information is generated by encrypting all state information before the interruption of the session with the second key.

The first decrypting unit uses the first key to decrypt the first encrypted information received by the first receiving unit and obtain the second key.

The second decrypting unit decrypts the second encrypted information with the second key to obtain all state information before the interruption of the session and recover the session.

Preferably, the first key is a session key or a TE key, and the second key is a session key or a TE key.

The apparatus is applicable to a system or network in client/server mode or a network of a similar type.

Another embodiment relates to a computer-readable storage medium. The computer-readable storage medium stores an instruction sequence of executing a method for recovering sessions. The method for recovering sessions includes: after a session is established between the server and the client, the client stores the session information of the session; when the session needs to be recovered upon interruption, the client sends the session information and all state information before the interruption of the session to the server; and the server recovers the session upon the received session information and all state information before the interruption of the session.

Preferably, after a session is established between the server and the client, the client stores the session information of the session in this way: The server uses a local key to encrypt the session information and the first key shared by the client and the server, and sends the encrypted first key and session information to the client for storing. Preferably, when the session needs to be recovered upon the interruption, the client sends all state information before the interruption of the session to the server in this way: The client uses the first key to encrypt all state information before the interruption of the session, and sends the encrypted state information, the encrypted first key received from the server, and the session information to the server. Preferably, the server recovers the session by using all state information before the interruption of the session in this way: The server uses the local key to decrypt the first key, uses the first key to decrypt all state information before the interruption of the session and obtain all information related to the session, thus recovering the session.

Preferably, when the session needs to be recovered upon the interruption, the client sends all state information before the interruption of the session to the server in this way: The client uses the first key shared by the server and the client to encrypt all state information before the interruption of the session, and sends the encrypted state information to the server. In this case, the server uses the information to recover the session in this way: The server uses the first key to decrypt all state information before the interruption of the session and obtain all information related to the session according to the session information, thus recovering the session.

Preferably, the first key is a session key or a TE key.

In the foregoing embodiments, after a session is interrupted, the server does not need to store any session-related information, thus saving the resources of the server; and all information about the previous session can be recovered completely.

Persons of ordinary skill in the art understand that all or part of the steps of the method in the foregoing embodiments may be implemented by a computer program instructing relevant hardware. The program may be stored in a computer-readable storage medium. When the program runs, the program executes the processes specified in the foregoing embodiments of the present invention. The storage medium may be a magnetic disk, a compact disk-read only memory (CD-ROM), a read-only memory (ROM), or a random access memory (RAM).

The describe embodiments are merely exemplary and are not intended to limit the scope of the claims. Many modifications, variations or replacements may be made to these embodiments without departing from the scope of the claims.

What is claimed is:

1. A method for recovering a secure shell (SSH) session upon interruption of the SSH session, the method, comprising:

sending, by a client, all state information before the interruption of the SSH session and session information of the session to a server, wherein all the state information comprises a completion ratio of data transmission, wherein the SSH session comprises a plurality of channels and wherein the session information includes information for one or more of the respective plurality of channels; and recovering, by the server, the SSH session upon the session information and all the state information before the interruption of the SSH session;

wherein before the SSH session is interrupted, the method further comprises:

receiving, by the client, a first key encrypted and the session information encrypted from the server after the SSH session is established between the server and the client, wherein the first key is shared by the client and the server, and the first key and the session information are encrypted through a local key of the server; and storing, by the client, the encrypted first key and the encrypted session information;

wherein the step of the client sending all state information before interruption of the SSH session to the server when the SSH session needs to be recovered upon interruption comprises:

encrypting, by the client, all the state information before the interruption of the SSH session with the first key, and sending, by the client, the encrypted state information, the encrypted first key, and the encrypted session information received from the server, to the server.

2. The method according to claim 1, wherein the first key is a session key or a traffic encryption (TE) key.

3. The method according to claim 1, further comprising:

receiving, by the client, a user identity (ID), address information, authentication information, session-related information, or security-related information, or any combination thereof, from the server after the session is established between the server and the client.

4. The method according to claim 3, wherein:

the security-related information comprises a validity period, a number of valid use times, or a timestamp of the first key, or any combination thereof.

5. The method according to claim 1, wherein:

the client further receives a validity period of a packet A, a timestamp of delivering the packet A, a user identity (ID) of the client who obtains the packet A, a SSH session ID, or authorization information of the client, or any combination thereof, from the server.

6. The method according to claim 5, wherein:

the client further sends a timestamp of requesting to recover the session, the user ID of the client, an Internet Protocol (IP) address, the SSH session ID, or session services being requested to be recovered, or any combination thereof, to the server.

7. A method for recovering a secure shell (SSH) session upon interruption of the SSH session, the method, comprising:

sending, by a client, all state information before the interruption of the SSH session and session information of the SSH session to a server, wherein all the state information comprises a completion ratio of data transmission, wherein the SSH session comprises a plurality of channels and wherein the session information includes information for one or more of the respective plurality of channels; and recovering, by the server, the SSH session upon the session information and all the state information before the interruption of the SSH session;

wherein the step of the client sending all state information before interruption of the SSH session to the server when the SSH session needs to be recovered upon interruption comprises:

encrypting, by the client, all state information before interruption of the SSH session with a first key shared with the server, and sending the encrypted state information to the server.

8. The method according to claim 7, wherein the first key is a session key or a traffic encryption (TE) key.

9. The method according to claim 7, further comprising:
receiving, by the client, a user identity (ID), address information, authentication information, session-related information, or security-related information, or any combination thereof, from the server after the session is established between the server and the client.

10. A method for recovering a secure shell (SSH) session, the method comprising: encrypting, by a server, session information of a client to generate first encrypted information through a local key when the Secure Shell (SSH) session is established between the server and the client, wherein the first encrypted information comprises the session information and a first key shared between the client and the server, wherein the SSH session comprises a plurality of channels and wherein the session information includes information for one or more of the respective plurality of channels; sending, by the server, the first encrypted information to the client; receiving, by the server, the first encrypted information and second encrypted information sent by the client when the SSH session needs to be recovered upon SSH interruption, the second encrypted information is generated, by the client, through encrypting all state information before the interruption of the SSH session with the first key, wherein all the state information comprises a completion ratio of data transmission; decrypting, by the server, the first encrypted information with the local key to obtain the first key and the session information; and decrypting, by the server, the second encrypted information with the first key to obtain the state information before the interruption of the SSH session and recover the SSH session.

11. The method according to claim 10, wherein:
the first encrypted information further comprises a user identity (ID), address information, authentication information, session-related information, or security-related information, or any combination thereof.

12. The method according to claim 11, wherein:
the security-related information comprises a validity period, a number of valid use times, or a timestamp of the first key, or any combination thereof.

13. The method according to claim 10, wherein:
the first encrypted information further comprises a validity period of a packet A, a timestamp of delivering the packet A, a user identity (ID) of the client who obtains the packet A, a SSH session ID, or authorization information of the client, or any combination thereof.

14. The method according to claim 13, wherein:
the second encrypted information further comprises a timestamp of requesting to recover the SSH session, the user ID of the client, an Internet Protocol (IP) address, the SSH session ID, or session services being requested to be recovered, or any combination thereof.

15. The method according to claim 10, wherein:
the first key is a session key or a traffic encryption (TE) key.

16. A non-transitory computer-readable storage medium containing a program, the program comprising instructions that when executed by a processor cause:
a first encrypting unit to encrypt session information of a Secure Shell (SSH) session with a first key to generate first encrypted information when the SSH session is established between an apparatus and a client, wherein the first encrypted information comprises a second key shared by the apparatus and the client, the first key is privately owned by the apparatus, and the client is unaware of the first key, wherein the SSH session comprises a plurality of channels and wherein the session information includes information for one or more of the respective plurality of channels;
a first sending unit to send the first encrypted information to the client;
a first receiving unit to receive second encrypted information and the first encrypted information when the SSH session between the apparatus and the client needs to be recovered upon SSH interruption, wherein the second encrypted information is generated by encrypting all state information before interruption of the SSH session with the second key, wherein all the state information comprises a completion ratio of data transmission;
a first decrypting unit to decrypt the first encrypted information received by the first receiving unit through the first key and obtain the second key; and
a second decrypting unit to decrypt the second encrypted information with the second key to obtain all state information before interruption of the SSH session and recover the SSH session.

17. The non-transitory computer-readable storage medium of claim 16, wherein:
the first key is a session key or a traffic encryption (TE) key, and the second key is a session key or a TE key.

\* \* \* \* \*